United States Patent [19]

Martin

[11] Patent Number: 4,462,032
[45] Date of Patent: Jul. 24, 1984

[54] RADAR SIGNAL PROCESSING PROCESS AND CIRCUIT

[76] Inventor: Philippe Martin, 5, Villa Thoreton, 75015 Paris, France

[21] Appl. No.: 262,899

[22] Filed: May 12, 1981

[30] Foreign Application Priority Data

May 22, 1980 [FR] France .................. 80 11443

[51] Int. Cl.$^3$ ............................................. G01S 13/90
[52] U.S. Cl. .............................. 343/5 CM; 343/5 FT
[58] Field of Search .................. 343/5 CM, 5 FT, 7.3, 343/5 SA, 100 CL, 350, 361, 364, 365; 364/516, 517, 725, 726, 728; 367/88

[56] References Cited

U.S. PATENT DOCUMENTS 3,900,721 8/1975 Speiser et al. .................. 364/725
4,045,795 8/1977 Fletcher et al. ................ 343/5 CM
4,132,989 1/1979 Arens ............................. 343/5 CM
4,282,579 8/1981 Speiser et al. .................. 364/725 X

OTHER PUBLICATIONS

Bonfield et al., "Synthetic-Aperture-Radar Real-Time Processing", IEE Proc., vol. 127, Pt. F, No. 2, Apr. 1980, pp. 155–162.

Primary Examiner—Maynard R. Wilbur
Assistant Examiner—K. R. Kaiser
Attorney, Agent, or Firm—Handal & Morofsky

[57] ABSTRACT

Process for real time signal processing for side-looking synthetic aperture radar systems, the signal consisting of sample sequences corresponding to given spacing gates. For each spacing gate an operation corresponding to an auto-correlation is directly performed on the radar signal, this relating to a product signal of a sample by a phase term varying quadratically with the rank of the sample, which supplies an estimate of the Fourier components of the radar image for each gate.

The invention also relates to a circuit for processing the radar signal in real time for performing the aforementioned process.

8 Claims, 6 Drawing Figures

RADAR SIGNAL PROCESSING PROCESS AND CIRCUIT

BACKGROUND OF THE INVENTION

The present invention relates to a process for processing a signal for side-looking and synthetic aperture radar systems and to a circuit for performing this process. It is used in remote detection, cartography by radar, etc and more specifically in the observation of the state of the ocean, where it permits the real time determination of the directional spectrum of the swell.

The technique of side-looking, synthetic aperture radar is used in active remote detection for obtaining a cartography of an extremely high frequency signal transmitted back by a surface. A very good spatial resolution can be obtained by a coherent demodulation of the signal received, followed by matched filtering of the signal. The thus obtained cartography is called the radar image. A description of this technique appears in numerous works or articles, including the following:

(1) R. O. HARGER "Synthetic Aperture Radar Systems" New York, Academic Press, 1970
(2) A. W. RIHACZEK "Principles of High Resolution Radar" New York, MacGraw Hill, 1969
(3) K. TOMIYASU "Tutorial Review of Synthetic-Aperture Radar (SAR) with Applications to Imaging of the Ocean Surface" Proceedings of the IEEE, Vol. 66, No. 5, May 1978, pp. 563-583.
(4) W. J. VAN DE LINDT "Digital Technique for Generating Synthetic Aperture Radar Images", IBM J. Res. Develop. September 1977, pp. 415–432
(5) HOMER JENSEN et al "Cartographie par Radar" Pour la Science, December 1977, pp. 80–92.

The image produced by a synthetic aperture radar carried on board a satellite and directed towards the ocean surface makes it possible to estimate the surface state thereof. This estimate is provided by calculating the bidimensional Fourier transform of the radar image, which makes it possible to determine the directional spectrum of the swell. The thus obtained information can be used in monitoring the state of the ocean (detecting storms, navigation aids) or in oceanographic research. The specifications of such a system impose numerous restraints, namely overall coverage, all-weather capacity, periodicity of a few hours and very rapid transmission of the information. These constraints can only be satisfied by a radar system carried by a satellite and associated with a system able to rapidly calculate the bidimensional Fourier transform of the radar image.

The presently used processes for calculating the Fourier transform of a radar image take place in two stages, i.e. the generation of the image and the calculation of the Fourier transform thereof.

The image can be generated by optical or digital process methods. The image is obtained on a photographic support in the first case and in the form of an image digitized on the magnetic tape of a data processor in the second case. The Fourier transform of the radar image is then determined by optical processing for photographs or by a computer for the digitized images.

However, these known processes are not well suited to the real time determination on board a satellite of the Fourier transform of the radar image. Thus, even if pulse compression forming the first stage in image generation can be carried out in real time by hybrid methods using acoustic surface wave devices, the second acoustic aperture stage requires very long processing times which are incompatible with a real time processing constraint. Moreover, image generation must be completed before it is possible to start the calculation of the Fourier transform. It is difficult to use optical processing methods in an automatic manner on board a satellite, due to the equipment and personnel required for performing the same.

The object of the present invention is to reduce the complexity and duration of processing required for obtaining, directly from the signal received by the radar and after coherent demodulation and pulse compression, the Fourier transform in the azimuth of the radar image. Naturally, it is then always possible to obtain an estimate of the radar image by reverse Fourier transformation.

In order to give a better idea of the questions involved, it is worth briefly referring to the diagrammatic structure of a side-looking, synthetic aperture radar system, as illustrated in FIG. 1. The structural details and the functions of the different organs shown can be gathered from the references indicated hereinbefore.

As illustrated, this system comprises an extremely high frequency wave generator 10 associated with a clock 12 fixing the repetition frequency Fr of the transmission, means 14 for modulating the frequency of the wave transmitted by generator 10, an amplifier 16, a circulator 18 and an antenna 20. This subassembly corresponds to the transmission means of the system.

The system shown also comprises a low noise amplifier 22, a pulse compression circuit 24 and a coherent detection circuit 26, which is also connected to generator 10. This detection takes place on the components of the signal in phase and in phase quadrature. This subassembly corresponds to the reception means of the system.

The system shown also comprises delay networks $30/1, 30/2 \ldots 30/p$ connected to the transmission clock 12 and gates $32/1, 32/2 \ldots 32/p$ able to select samples $s^1, s^2 \ldots s^p$ located in the corresponding gates from the signal supplied by the detection circuit. The overall circuit able to supply these samples carries the reference numeral 33.

Finally, the system comprises means 34 for forming the radar image from the signals $s^1, s^2 \ldots s^p$, as well as means 36 for calculating from the said image the Fourier transform thereof.

This equipment is generally carried by a moving craft (satellite, aircraft, etc.) in such a way that transmission means 40 are provided thereon for transmitting the desired data to the ground. Said data can comprise Fourier components obtained at the output of circuit 36 (connection 42 between 36 and 40) or by the image produced by means 34, in which case the output of said means is directly connected to the transmission means 40 (connection 44) and the Fourier transformer is located on the ground. The data can also comprise signals sampled further upstream, such as e.g. at the output of the coherent detection circuit 26 and of the transmission clock 12 (connection 46).

The operating principle of this system is based directly on that of synthetic aperture radar systems. Radar transmission is discontinuous and is performed at the repetition frequency $F_r$. Frequency modulation and then pulse compression make it possible to improve the resolution in the radial direction. Coherent detection permits the aperture synthesis by which the range of the lateral antenna can be reduced. The gates are opened with a certain delay compared with the transmission times of the radar wave and the signals passing through the same correspond to echos coming from obstacles located at predetermined distances from the antenna. Thus, these signals are samples associated with the different spacing gates. The image is formed from these samples by optical or electronic means, in the manner indicated hereinbefore.

BRIEF SUMMARY OF THE INVENTION

The present invention relates to a process and to a circuit for processing a signal, applicable to such equipment and which in particular makes it possible to obtain directly and in real time Fourier components from radar signals without it being necessary to form a radar image beforehand.

The invention has resulted from work carried out by the Applicant, which has shown that it was possible to estimate azimuthal Fourier components by simple processing of samples relative to each spacing gate, at the cost of certain generally justified approximations. This processing consists of an autocorrelation of a signal equal to the product of the radar signal by a phase term which varies quadratically with the rank of the sample.

Analytically, this processing is expressed as follows. In a random spacing gate, the samples are designated $s_m$, m being an integer fixing the rank of the samples. According to the invention, a given signal $Z(f)$ is formed by:

$$Z(f) = \frac{2\alpha}{N^2}\left[\overline{\left(s_m \exp\left(i\pi \frac{2\alpha}{N^2} m^2\right)\right)}\right] * \left[\left(s_m \exp\left(i\pi \frac{2\alpha}{N^2} m^2\right)\right)\right] \quad (1)$$

in which the * indicates a convolution, the bar a conjugate complex (i.e. a signal of opposite phase for signals which are defined in amplitude and in phase) $\alpha$ and $N$ are two constants defined by the operating conditions of the radar and $i$ is the conventional symbol for the imaginary with $i^2 = -1$.

The frequency $f$ is equal to $(2\alpha/N^2) n$, n being an integer between 0 and $N/2$.

Thus, for forming the component $Z(f)$, it is possible to proceed as follows. Firstly, a signal $(p_m)$ produced from each sample received $(s_m)$ by a phase term equal to $$\exp\left(i\pi \frac{2\alpha}{N^2} m^2\right)$$

is formed. In the same way is formed the signal $(P_{m-n})$ delayed by n positions, i.e.

$$s_{m-n} \exp\left[i\pi \frac{2\alpha}{N^2} (m-n)^2\right].$$

The conjugate of the first product, i.e. $p_m$ is taken and the product $p_m \cdot p_{m-n}$ is formed, i.e.

$$\overline{s_m \exp\left(i\pi \frac{2\alpha}{N^2} m^2\right)} \cdot s_{m-n} \exp\left[i\pi \frac{2\alpha}{N^2} (m-n)^2\right]$$

With n fixed, the sum of all these products is formed when rank m assumes all the values from 0 to $M-1$, M being a predetermined number fixing the duration of the calculation and the sum obtained is multiplied by $2\alpha/N^2$, giving a component $Z(f)$ equal to:

$$Z(f) = \frac{2\alpha}{N^2} \sum_{m=0}^{M-1}\left[\overline{s_m \exp\left(i\pi \frac{2\alpha}{N^2} m^2\right)}\right] \cdot \quad (2)$$

$$s_{m-n} \exp\left[i\pi \frac{2\alpha}{N^2} (m-n)^2\right]$$

which is a good expression of the autocorrelation function expressed by (1).

It is possible to proceed in a slightly different manner by writing (2) in the form:

$$Z(f) = \frac{2\alpha}{N^2} \sum_{m=0}^{M-1} \overline{s_m} s_{m-n} \exp\left[i\pi \frac{2\alpha}{N^2} (-2nm + n^2)\right] \quad (3)$$

$$Z(f) = \frac{2\alpha}{N^2} \exp\left(i\pi \frac{2\alpha}{N^2} n^2\right) \sum_{m=0}^{M-1} \overline{s_m} \cdot s_{m-n} \exp(-i2\pi fm)$$

To within the multiplication factor, this equation represents an autoambiguity function or a double correlation and Fourier function. A slightly different process therefore consists of calculating $\overline{s_m}$, delaying $s_m$ by n ranks, then forming the product of $\overline{s_m}$ by $s_{m-n}$, multiplying the product obtained by $\exp(-i2\pi fm)$, forming the sum of all the terms obtained by giving to m, M values from 0 to $M-1$ and finally multiplying the sum obtained by $$\frac{2\alpha}{N^2} \exp\left(i\pi \frac{2\alpha}{N^2} n^2\right).$$

Other processes based on this can be worked out by the expert and will not pass beyond the scope of the invention as they would be equivalent to the autocorrelation defined hereinbefore. In this way, it is possible to carry out a spectral analysis of the product signal $(p_m)$ followed by a reverse Fourier transformation.

The invention also relates to a circuit making it possible to perform the process described hereinbefore and which essentially comprises means for carrying out the equivalent of an autocorrelation on signals equal to the samples supplied by the radar multiplied by a phase term varying quadratically with the rank of the sample. This circuit can either comprise an autocorrelator in the strict sense (for calculating components according to equation (2)) or an ambiguimeter (for calculations in accordance with equation (3)) or any other equivalent system.

BRIEF DESCRIPTION OF THE DRAWINGS

The invention is described in greater detail hereinafter relative to non-limitative embodiments and the attached drawings, wherein show.

BRIEF DESCRIPTION OF THE PREFERRED EMBODIMENTS

Before describing the means making it possible to perform the invention, the operations forming the essence thereof and which have been defined hereinbefore (autocorrelation, autoambiguity, etc) will now be justified. However, the mathematical aspect of the problem is manifestly outside the scope of the invention, so that only the fundamental points will be dealt with and the intermediate stages can easily be established by the expert.

Thus, the invention proposes the real time calculation of Fourier components of a radar image. This image is defined by the effective cross-section of the analysed surface, which is scanned by an extra high frequency wave irradiated by a radar antenna. As this wave is of the pulse type, the signals which are transmitted back are discrete and not continuous signals. Thus, the effective cross-section of the surface is designated by the form $z_m$ in which m is an integer and not z(t) in which t would be time. For the same reasons, the Fourier transformation which it is necessary to carry out is a discrete and not a continuous transformation, the Fourier components having the following form $$Z(f) = \sum_{m=0}^{M-1} z_m \exp\left(-i2\pi f \frac{m}{M}\right) \quad (1)$$

Conversely, the effective cross-section $z_m$ is expressed from the component Z(f) by $$Z_m = \frac{1}{M} \sum_{f=-M/2}^{M/2-1} Z(f) \exp\left(i2\pi m \frac{f}{M}\right) \quad (1')$$

Moreover, this effective cross-section is equal to the square of the modulus of the complex back-transmission coefficient designated $f_m$:

$$z_m = f_m \cdot \bar{f}_m$$

in which $\bar{f}_m$ designates the conjugate complex of $f_m$.

Figure 2:
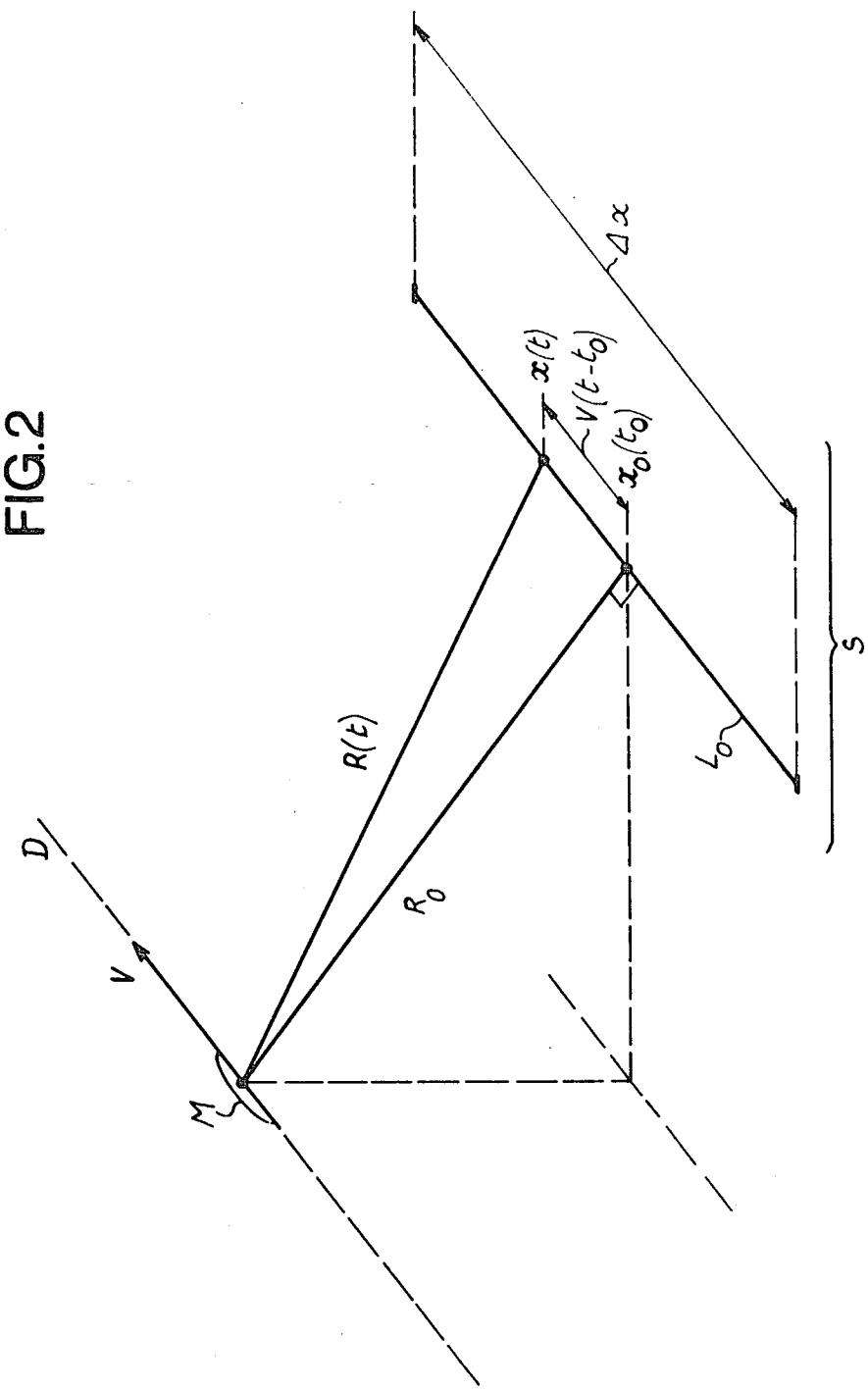
FIG. 2 a diagram making it possible to define certain notations and definitions.

The invention proposes to calculate the Fourier component Z(f) by directly processing the samples supplied by the detection circuit of the radar system and not by using a previously formed radar image. Before defining the form taken by the different signals envisaged by the invention, certain notations will be defined with reference to FIG. 2.

The radar is carried on board a moving craft M moving in the direction D at a speed V. It transmits an extremely high frequency wave of wavelength λ at a repetition frequency $F_r$ in the direction of a surface S to be analysed. On surface S, the analysed line $L_o$ is at a distance $R_o$ from the trajectory of the craft carrying the radar system. The current point of this line has an abscissa x at time t and its distance from the craft is R(t). At time $t_o$, the abscissa of the current point is $x_o$ and its distance from the craft equal to $R_o \cdot \Delta x$ stands for the length of the line on surface S and along $L_o$ of the radar beam and N is the number of pulses received by a point of $L_o$ for the time when it is located in said line. Conversely, in a reference which is linked with the moving craft, N is the number of pulses transmitted by the radar during the time when said point traverses the line on the ground. As the time taken by an obstacle to traverse the radar line on the ground is $T=\Delta x/v$, we obtain: $N=(\Delta x/V)F_r$.

We set $\alpha = \Delta x^2/\lambda R_o$. The coefficients N and α are then characteristics of the radar defined by its operating conditions.

The coefficient α is then equal to half the product of the time T by Doppler broadening B of the signal. It is therefore a dimensionless number. Constant N is also a dimensionless number. These two constants α and N are of a standard nature in the theory of synthetic aperture radar systems.

Moreover, the frequency f defining the different sought Fourier components assume N/2 values between 0 and α/N and can be designated:

$$f = (2\alpha/N^2)n$$

in which n varies from 0 to +N/2.

It is also possible to use the form:

$$f = \pm(2\alpha/N^2)n$$

which introduces "negative frequencies" which is useful if it is desired to perform a reverse Fourier transform, giving $Z(f)=\overline{Z(-f)}$.

Finally, the term azimuthal direction is used for a direction parallel to D (i.e. parallel to the direction of movement of the craft), whilst radial direction is a direction perpendicular to D. Therefore, an azimuthal Fourier component is a Fourier component of a linear image in direction D. A radial Fourier component is a Fourier component of an image considered in the perpendicular direction.

Following the definition of these notations, it is firstly possible to indicate the form assumed by the radar signal on leaving the receiver for a given spacing gate. In the case of continuous radar transmission, the radar signal $s(x_o)$ obtained at the time when $x=x_o$ would be given by an integral of shape:

$$s(x_o) = \int_{-\frac{\Delta x}{2}}^{\frac{\Delta x}{2}} f(x - x_o) \cdot h(x) dx \quad (3)$$

in which h is a phase term. As radar transmission takes place in pulse-like manner at the repetition frequency $F_r$, the integral (3) must be replaced by a summation on k and the radar signal is a sample $s_n$ given by:

$$s_n = \sum_{k=-\frac{N}{2}}^{k=+\frac{N}{2}} f_{n-k} h_k \quad (4)$$

The phase term $h_k$ will now be defined. The phase $\phi(t)$ of the wave coming from a back-transmitted obstacle located at a distance R(t) from the radar is given by:

$$\phi(t) = -\frac{4\pi}{\lambda} R(t) = -\frac{4\pi}{\lambda} \{R_o^2 + V^2(t - t_o)^2\}^{\frac{1}{2}}$$

If it is assumed that the distance $V(t-t_o)$ is well below $R_o$, an approximation of $\phi(t)$ is:

$$\phi(t) = -\frac{4\pi}{\lambda}\left(R_o + \frac{V^2(t - t_o)^2}{2R_o}\right)$$

On neglecting the constant term, the phase factor is then of form:

$$h(t) = \exp - \left\{\frac{i2\pi V^2(t - t_o)^2}{\lambda R_o}\right\}$$

or:

$$\exp\left\{-\frac{i2\pi}{\lambda R_o}(x - x_o)^2\right\}$$

Whilst still assuming that radar transmission is not continuous and takes place in the form of pulses at the repetition frequency $F_r$, the phase term $h_k$ then varies with the rank k, i.e.:

$$\exp\left\{-i\frac{2\pi}{\lambda R_o}\left(\frac{V}{F_r}\right)^2 k^2\right\} \tag{5}$$

or:

$$h_k = \exp\left(-i2\pi a \frac{k^2}{N^2}\right)$$

The radar signal is thus finally of form:

$$s_n = \sum_{k=-\frac{N}{2}}^{N/2} f_{n-k} \exp\left(-i2\pi a \frac{k^2}{N^2}\right) \tag{6}$$

The problem to be solved by the invention is to find the components $Z(f)$ as defined by (1) in a direct manner from signals $s_n$, as defined by (6).

To solve this problem, certain prior hypotheses must be made and these are in fact of a standard nature in this type of calculation:

the order M of the discrete Fourier transform corresponding to the azimuthal dimension of the analysed zone is assumed to be predetermined;

the sample sequences are artificially extended by an appropriate number of zeros in such a way that the circular convolution and the linear convolution of the sequences are equivalent and the discrete convolution theorum can then be applied (cf the work of L. R. RABINER and B. GOLD entitled "Theory and application of digital signal processing", New York, Prentice Hall, 1975);

the time and frequency sequences are considered to have a period M making it possible to use the displacement properties of the Fourier transform (cf the above work, as well as that by M. Schwartz and M. Shaw, 1975 "Signal processing: Discrete Spectral Analysis, Detection and Estimation", New York, McGraw Hill).

Under these conditions, we obtain the equations (7) to (10):

$$F_k = \sum_{j=o}^{M-1} f_j \exp\left(-i2\pi \frac{jk}{M}\right) \tag{7}$$

$$f_j = \frac{1}{M} \sum_{k=o}^{M-1} F_k \exp\left(i2\pi \frac{jk}{M}\right) \tag{8}$$

$$S_k = \sum_{j=o}^{M-1} s_j \exp\left(-i2\pi \frac{jk}{M}\right) \tag{9}$$

$$H_k = \sum_{j=o}^{M-1} h_j \exp\left(-i2\pi \frac{jk}{M}\right) \tag{10}$$

In the above equations, the functions designated in capital letters are Fourier transforms, functions being designated by the same small letter.

On returning to equation (5), it can be seen that $h_k$ is in the form of a signal linearly modulated in frequency due to the presence of a term in $k^2$. It is known that under these conditions (cf the aforementioned work by A. W. RIHACZEK, pp. 231 ff) that an approximate expression of the Fourier transform $H_k$ of this phase term $h_k$ is $$H_k = \frac{N}{2a} \exp\left(i2\pi a k^2/K^2 + i\frac{\pi}{4}\right) \text{ if } k < \frac{K}{2} \tag{11}$$

with $K = 2a\frac{M}{N}$ and $H_k = 0$ if $k > \frac{K}{2}$.

According to the convolution theorum, equation (4) expressing the signal received is equivalent to:

$$S_k = F_k \cdot H_k \tag{12}$$

By replacing $H_k$ by its value (11), we obtain:

$$\text{and } \begin{cases} S_k = \frac{N}{2a} F_k \exp\left(i2\pi a \frac{k^2}{K^2} + i\frac{\pi}{4}\right) & \text{if } k < \frac{K}{2} \\ S_k = 0 & \text{if } k > \frac{K}{2} \end{cases} \tag{13}$$

It is possible to obtain $F_k$:

$$F_{k'} = \frac{2a}{N} S_k \exp\left(-i2\pi a \frac{k^2}{K^2} - i\frac{\pi}{4}\right) \tag{14}$$

With regards to the effective cross-section $z_m = f_m \cdot \overline{f}_m$, according to equation (8) it can be expressed by:

$$z_m = \tag{15}$$

$$\frac{1}{M^2}\left(\sum_{k'=o}^{M-1} F_{k'} \exp\left(i2\pi \frac{k'm}{M}\right)\right)\left(\sum_{k=o}^{M-1} \overline{F}_k \exp\left(-i2\pi \frac{km}{M}\right)\right)$$

The circular properties of the discrete Fourier transform lead to the following equation between $z_k$ and $F_k$:

$$Z_k = \frac{1}{M} \sum_{j=0}^{M-1} F_j \overline{F_{j-k}} \qquad (16)$$

Function $F_j$ can be calculated by (14) and we obtain:

$$Z_k = \frac{1}{M} \frac{2\alpha}{N^2} \sum_{j=0}^{M-1} S_j \overline{S_{j-k}} \exp\left( -i2\pi\alpha \frac{j^2}{K^2} - \frac{i\pi}{4} + i2\pi\alpha \frac{(j-k)^2}{K^2} + i\frac{\pi}{4} \right) \qquad (17)$$

This equation is valid for $|j| < K/2$ and $|j-k| < K/2$. Since outside these ranges $S_j$ and $S_{j-k}$ are 0 (cf equation (13)) we obtain:

$$Z_k = \qquad (18)$$

$$\frac{2\alpha}{N^2} \frac{1}{M} \exp\left( i2\pi\alpha \frac{k^2}{K^2} \right) \sum_{j=0}^{M-1} S_j \overline{S_{j-k}} \exp\left( -i2\pi\alpha \frac{2jk}{K^2} \right)$$

$S_j$ and $S_{j-k}$ can be expressed by sums in accordance with equation (9), leading to the calculation of an expression of form:

$$\sum_{j=0}^{M-1} \left\{ \sum_{j=0}^{M-1} s_l \exp\left( -i2\pi \frac{nj}{M} \right) \right\} \left\{ \sum_{m=0}^{M-1} \overline{s_m} \exp\left( i2\pi \frac{m(j-k)}{M} \right) \right\} \times \exp\left( -i2\pi\alpha \frac{2jk}{K^2} \right) \qquad (19)$$

Or with $\beta = N/K$, an expression of the following form is calculated:

$$\sum_{n=0}^{M-1} \sum_{m=0}^{M-1} s_n \overline{s_m} \exp\left( -i2\pi \frac{mk}{M} \right) \left\{ \frac{1}{M} \sum_{j=0}^{M-1} \exp\left[ i\frac{2\pi}{M} j(-\beta k + m - n) \right] \right\} \qquad (20)$$

Or by utilizing the fact that the expression between brackets is the sum of the terms of a geometrical progression, the following expression can be calculated:

$$\sum_{m=0}^{M-1} S_{-\beta k+m} \cdot \overline{S_m} \exp\left( -i2\pi \frac{mk}{M} \right) \qquad (21)$$

if and only if $\beta k$ is an integer.

By an immediate transposition of these notations, it is finally possible to obtain an expression of form:

$$Z(f) = \frac{2\alpha}{N^2} \exp\left( i\pi f^2 \frac{N^2}{2\alpha} \right) \sum_{m=0}^{M-1} \overline{s_m} \cdot s_{m-n} \exp(-i2\pi fm) \qquad (22)$$

or finally $$Z(f) = \frac{2\alpha}{N^2} \sum_{m=0}^{M-1} \overline{s_m} s_{m-n} \exp i\pi \frac{2\alpha}{N^2} [-2nm + n^2] \qquad (23)$$

or finally $$Z(f) = \qquad (24)$$

$$\frac{2\alpha}{N^2} \sum_{m=0}^{M-1} \overline{s_m \exp\left( i\pi \frac{2\alpha}{N^2} m^2 \right)} s_{m-n} \exp\left[ i\pi \frac{2\alpha}{N^2} (m-n)^2 \right]$$

Equation (24) indicates that Fourier components can be obtained by a discrete autocorrelation performed on signal $s_m \exp(i\pi 2\alpha/2N^2 m^2)$, i.e. on a signal equal to the product of a sample of rank m by a phase term quadratically dependent on said rank.

The intermediate equation (22) shows that these components can also be obtained by a discrete auto-ambiguity function relating to the samples $s_m$.

Figure 3:
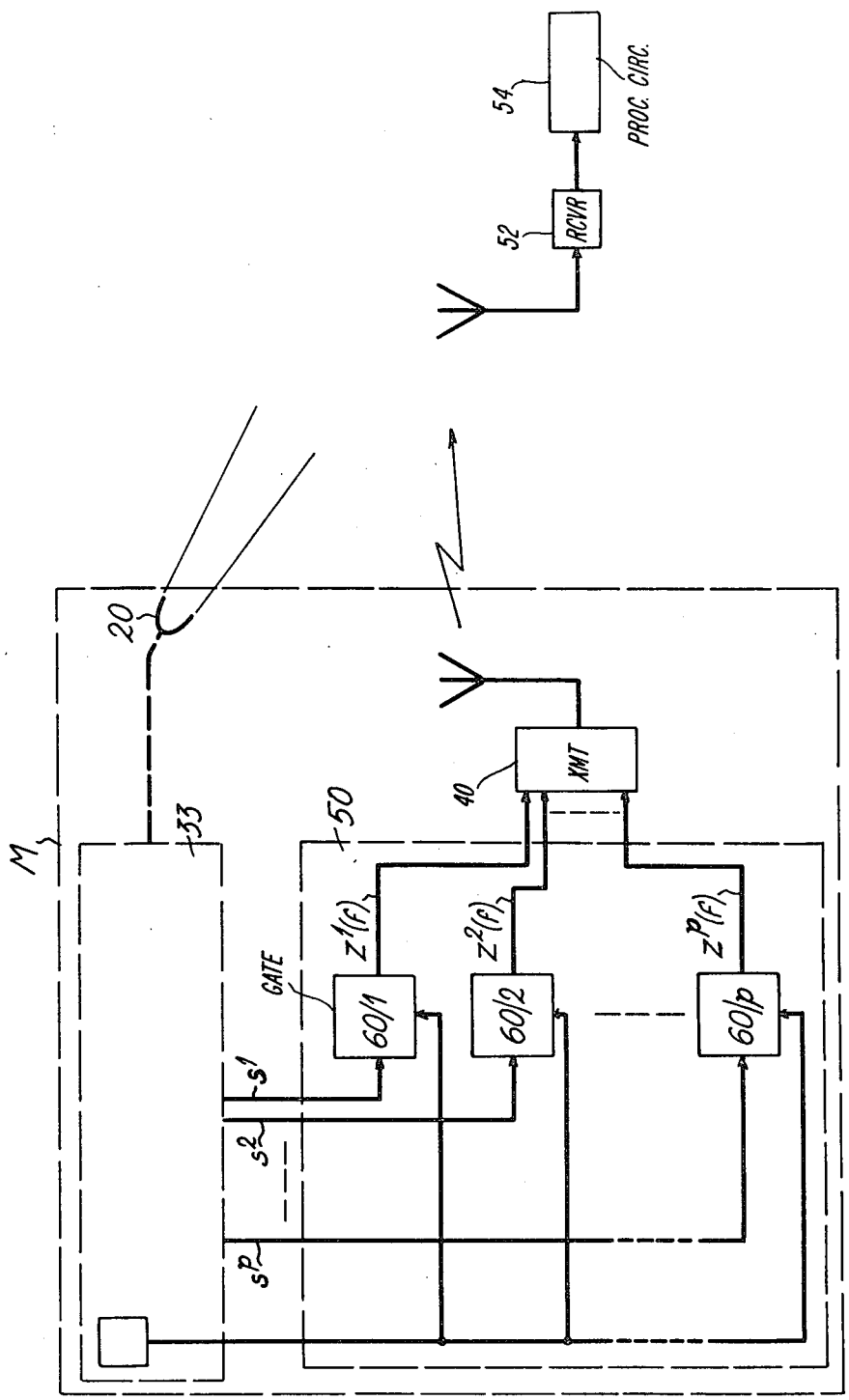
FIG. 3 a diagram of equipment using the circuit according to the invention.
Figure 4:
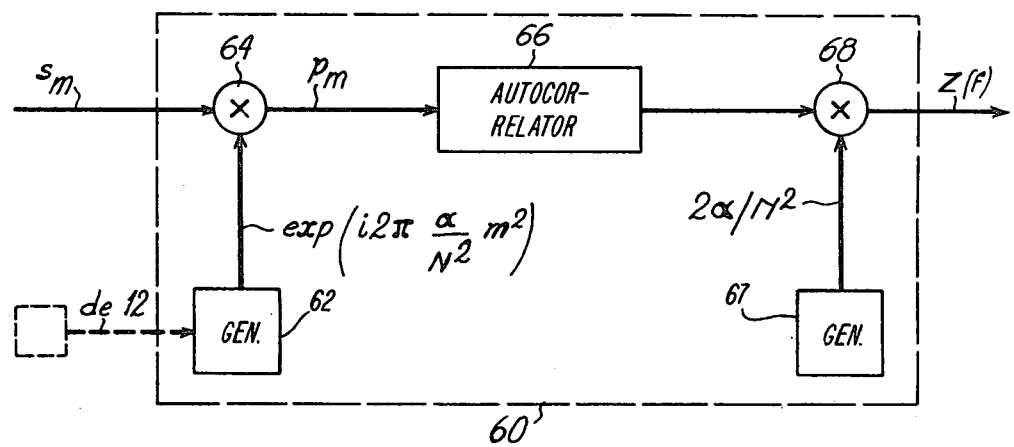
FIG. 4 a first embodiment of the processing circuit according to the invention.
Figure 5:
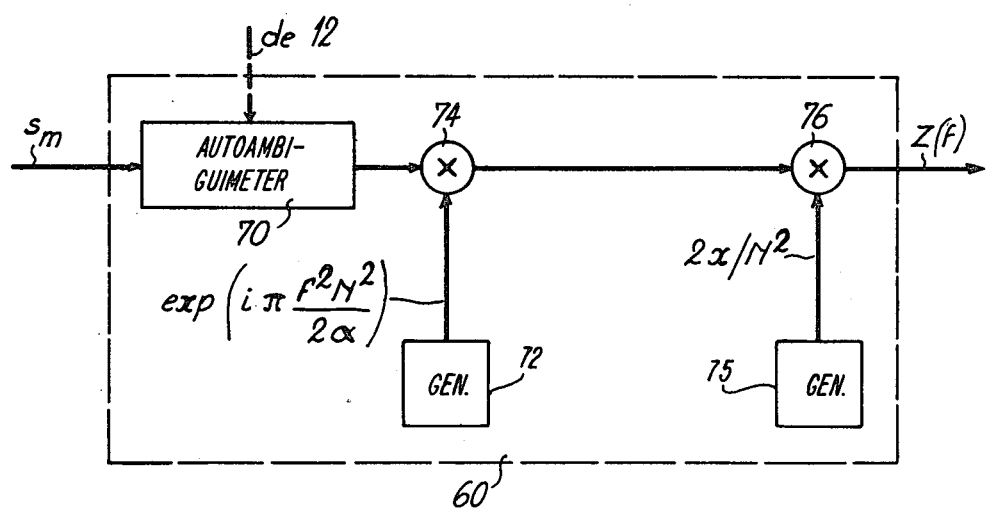
FIG. 5 a second embodiment of a processing circuit according to the invention.

The means making it possible to realise the process defined hereinbefore are synoptically illustrated by FIGS. 3 to 5.

Figure 1:
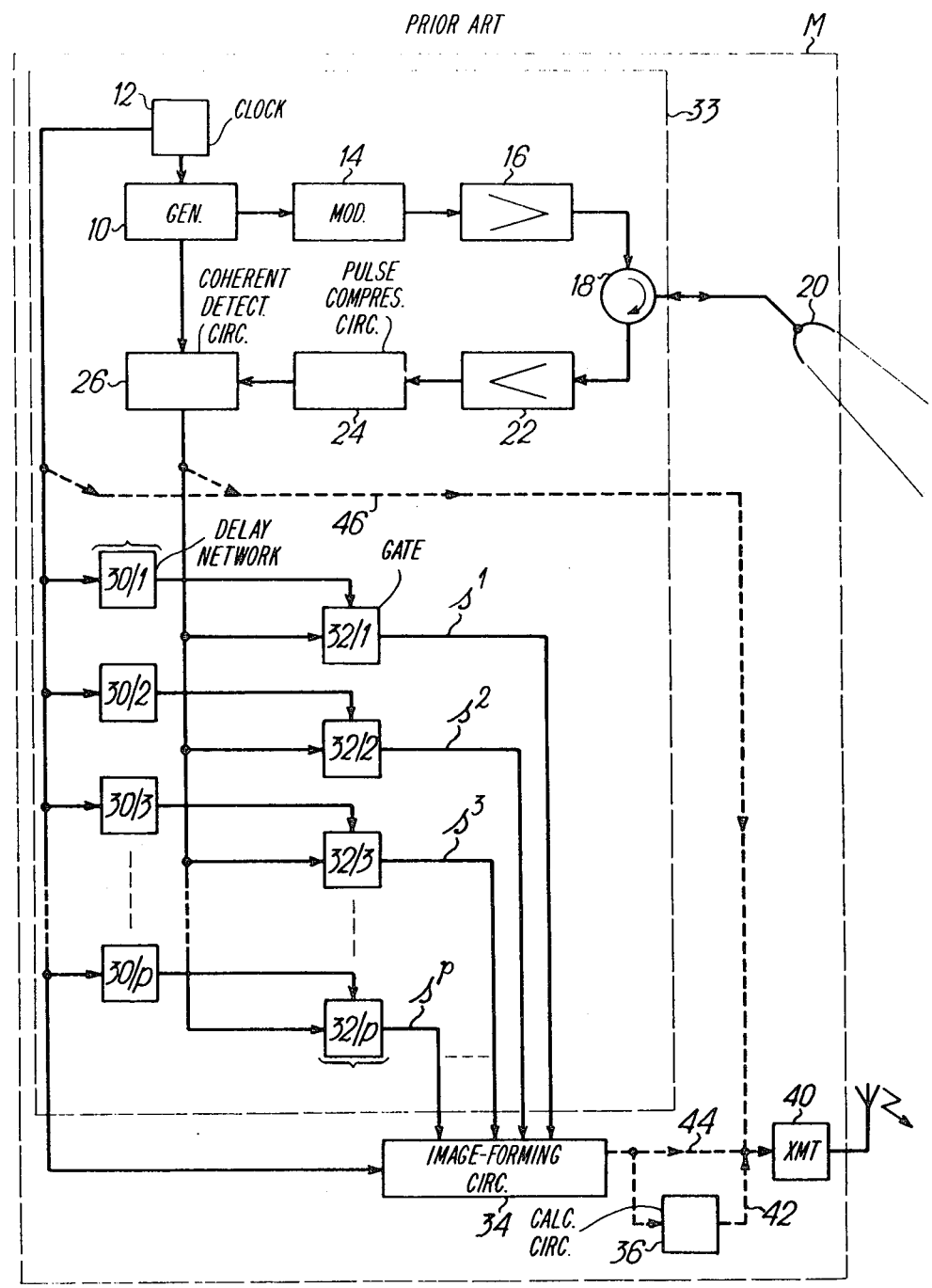
FIG. 1 an example of a prior art circuit for a side-looking, synethetic aperture radar system.

FIG. 3 firstly illustrates the position occupied by these means and permits easy comparison with the prior art, as shown in FIG. 1. The calculating means according to the invention is given reference numeral 50 and receives samples $s^1$, $s^2$, ... $s^p$ supplied by circuit 33 for the p spacing gates in question. A circuit for calculating Fourier components is provided for each gate, i.e. 60/1 for the first gate, 60/2 for the second gate ... 60/p for the pth gate. These p circuits supply p groups of components $Z^1(f)$, $Z^2(f)$ ... $Z^p(f)$ for the different gates, i.e. for the different lines analysed. Each group comprises $N/2+1$ components obtained when f assumes the values $2\alpha n/N^2$ assuming $N/2+1$ values from 0 to $N/2$. The frequency f therefore varies from 0 to $\alpha/N$.

These groups of components can be transmitted from the moving craft M to a ground reception station comprising reception means 52 and subsequent processing means 54.

This processing may, for example, consist of a calculation of the radial Fourier components on the basis of groups of azimuthal Fourier components, which makes it possible to obtain the bidimensional Fourier transform. It may also consist of a reverse Fourier transformation giving an estimated image of the analysed surface along a line corresponding to a gate. All the different images estimated for different lines will then supply an estimated bidimensional radar image.

FIG. 4 shows a first embodiment of a circuit which is able to constitute one of the circuit 60/1, 60/2 ... 60/p. This circuit carries the reference numeral 60, the superscripts indicating the gate number being omitted because the circuit is applicable to any random spacing gate (so that the coefficient $\alpha$ dependent on this gate via $R_o$ is now adjusted). This circuit receives a sequence of samples $s_m$ for different values of m from 0 to $M-1$ and for a predetermined spacing gate. It supplies the sequence of component Z(f) for $N/2+1$ values of f defining the azimuthal Fourier transform for this distance.

In the illustrated embodiment, circuit 60 comprises a generator 62 supplying a phase signal equal to exp $(i2\pi\alpha/N^2 m^2)$, a multiplier 64 receiving this signal and the sequence of samples $s_m$ and supplying a product signal $P_m$, an autocorrelator 66 connected to multiplier 64, a generator 67 supplying a constant term $2\alpha/N^2$ and finally a multiplier 68 connected to said generator and to the autocorrelator.

It is obvious that such a circuit is able to supply signals Z(f), as defined by the equation (24).

Generator 62 can receive a clock signal from transmission clock 12, which times the sequence of samples. This generator can be constituted by a phase displacement table associated with an address memory read whenever a sample is received.

Figure 6:
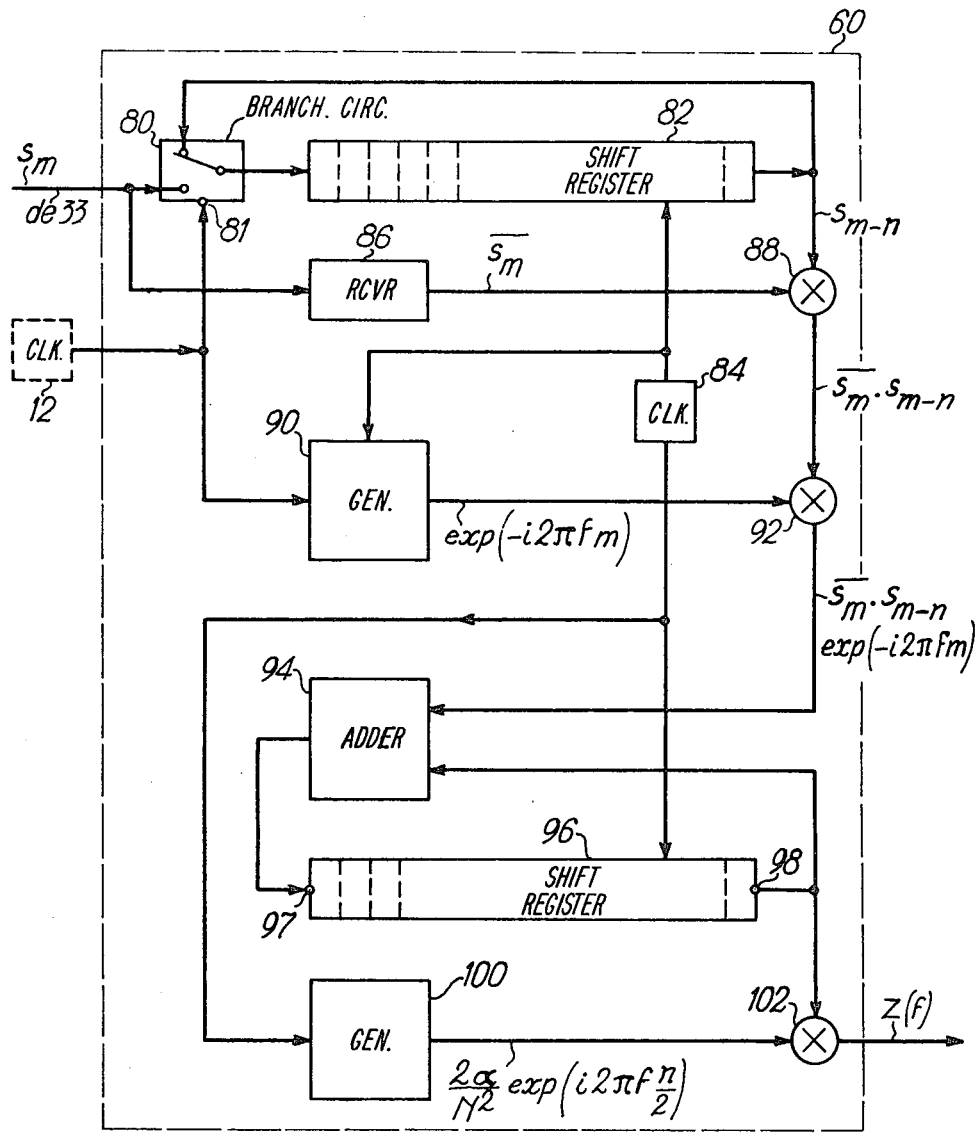
FIG. 6 an example of a circuit for calculating Fourier components by the variant using an ambiguity function.

Autocorrelator 66 can be of a random known type and there is no need to describe it here. It is known that it is an apparatus which generally comprises a shift register, multipliers and an adder, said means being able to carry out the multiplication of time-displaced samples and then form the sum of the products obtained. An example of a circuit of this type is illustrated in FIG. 6.

The circuit of FIG. 5 permits the realisation of another variant of the process of the invention. This variant is based on equation (22) which expresses an autoambiguity function. To this end, the circuit comprises an autoambiguimeter 70, a generator 72 supplying a phase term $\exp(i\pi f^2 N^2/2\alpha)$, a multiplier 74 connected to ambiguimeter 70 and to generator 72, a generator 75 supplying a constant signal $2\alpha/N^2$ and a multiplier 76 connected to said generator and to multiplier 74. It is obvious that such a circuit makes it possible to calculate coefficients as defined by equation (22).

Naturally, generators 72 and 75 can be combined into a single generator, in which case multipliers 74 and 76 are also combined.

The ambiguimeter can be of any known type and can in particular function by using random signals to which are added the samples to be processed, the sign of the sum only being taken into consideration for carrying out calculations. Such an apparatus is described for example in French patent application No. 2,172,858 published on Oct. 5, 1973 and entitled "Process for estimating the ambiguity function and apparatus for performing this process".

To illustrate the type of circuit used in the invention, FIG. 6 relates to a variant corresponding to the diagram of FIG. 5. The circuit shown comprises a branching circuit 80 with two inputs and one output, one of the inputs receiving the samples $s_m$. This branching circuit is controlled by clock pulses applied to a control input 81 and coming from the transmission clock 12; a shift register 82 with N/2 cells, whose output is relooped onto the other input of branching circuit 80; a clock 84 controlling the displacement in register 82, the timing of said clock being N/2 times faster than the timing of transmission clock 12; a circuit 86 receiving samples $s_m$ and supplying conjugate samples, i.e. $\bar{s}_m$; a multiplier 88 connected to the output of register 82 and to circuit 86; a generator 90 supplying a phase signal $\exp(-i2\pi fm)$, which is timed by transmission clock 12 (to fix coefficient m) and by clock 84 (to fix term f, or in other words n); a multiplier 92 connected to multiplier 88 and to generator 90; an adder 94 with two inputs, one of which is connected to multiplier 92; a shift register 96 with N/2+1 cells having an input 97 connected to the output of adder 94 and an output 98 relooped onto the other input of the same adder; a circuit 100 able to produce a signal $$\frac{2\alpha}{N^2} \exp\left(i2\pi f \frac{n}{2}\right);$$

and finally a multiplier 102 connected to said circuit and to the output 98 of register 96.

This circuit functions in the following manner. The samples contained in register 82 are displaced from cell to cell with a rapid timing defined by clock 84. Multiplier 88 supplies signal $\bar{s}_m \cdot s_{m-n}$ for all the fixed values from n to m. Whenever a new sample $s_m$ arrives, i.e. at a slow timing fixed by transmission clock 12, this new sample takes its place in register 82 due to the switching of branching circuit 80 and the oldest sample is lost. Moreover, circuit 90 supplies with a slow timing, the phase term $\exp(-2i\pi fm)$ in such a way that for each m a sequence of signals of form $\bar{s}_m \cdot s_{m-n} \cdot \exp(-i2\pi fm)$ is obtained at the output of multiplier 92. These signals circulate between register 96 and adder 94 in such a way that the terms relating to the same rank n are added to each new m. Thus, sum signals are formed equal to:

$$\Sigma_m \bar{s}_m \cdot s_{m-n} \exp(-i2\pi fm).$$

When the rank m has assumed its M values from 0 to M−1, the N/2+1 sought Fourier components are found in register 96, to within a coefficient. Circuit 100 produces the coefficient in question and the operating multiplier 102 supplies the definitive components Z(f).

Such a circuit is easily transformed into an autocorrelator by eliminating circuit 90. In order to once again obtain the circuit of FIG. 4, it is then merely necessary to add a generator 62 able to supply a phase signal $\exp(i2\pi\alpha/N^2 m^2)$ to the input.

What is claimed is:

1. A process for real time signal processing for sidelooking, synthetic radar systems, said signal consisting of samples sequences corresponding to given spacing gates, wherein for each sample $s_m$ of rank m a first product signal $p_m = s_m \exp(i\pi(2\alpha/N^2)m^2)$ is formed in which $\alpha$ and $N^2$ are constants defined by the operating conditions of the radar system, a second product signal delayed by n ranks (i.e. $p_{m-n}$) is stored, the conjugate of said first product signal (i.e. $\bar{p}_m \cdot p_{m-n}$) is formed, the product for fixed n the sum of the products formed, m assuming all whole values from 0 to M−1, being a predetermined number, which gives, to within a coefficient $2\alpha/N^2$, a Fourier component Z(f) for the frequency f linked with n with $f = (2\alpha/N^2) n$, the different components being obtained by giving all whole values from 0 to N/2 to n.

2. A process according to claim 1, wherein as the radar system is carried on a moving craft, said processing is carried out on board of said craft, the Fourier components obtained then being transmitted from said craft to the ground, and wherein all the azimuthal Fourier components for different spacing gates are grouped on the ground, which makes possible the calculation of the radial Fourier transform of a radar image.

3. A process according to claim 1, wherein on each group of Fourier components corresponding to a given spacing gate an inverse Fourier transformation is performed, giving an estimated image of the surface analyzed along a line corresponding to said gate and wherein the different estimated images obtained in this way for different lines are grouped together, supplying an estimated bidimensional radar image.

4. A process for real time signal processing for sidelooking, synthetic radar systems, said signal consisting of samples sequences corresponding to given spacing gates, wherein for each sample $s_m$ of rank m the conjugate sample $\bar{s}_m$ is formed as well as a sample delayed by n ranks (i.e. $s_{m-n}$), the product $\bar{s}_m \cdot s_{m-n} \exp(-i2\pi fm)$ is formed in which f is linked with n by $f = 2\alpha/N^2 n$ in which $\alpha$ and N are two constants defined by the operating conditions of the radar system, the sum of all these products is formed, m assuming all whole values from 0 to $M-1$, M being a predetermined number giving, to within a coefficient $(2\alpha/N^2)\exp(i\pi(2\alpha/N^2)n^2)$, a Fourier component at frequency f, the difference in the components being obtained by giving n all whole values from 0 to N/2.

5. A process according to claim 4, wherein as the radar system is carried on a moving craft, said processing is carried out on board of said craft, the Fourier components obtained then being transmitted from said craft to the ground, and wherein all the azimuthal Fourier components for different spacing gates are grouped on the ground, which makes possible the calculation of the radial Fourier transform of a radar image.

6. A process according to claim 4, wherein on each group of Fourier components corresponding to a given spacing gate an inverse Fourier transformation is performed, giving an estimated image of the surface analyzed along a line corresponding to said gate and wherein the different estimated images obtained in this way for different lines are grouped together, supplying an estimated bidimensional radar image.

7. A circuit for processing a radar signal produced by a radar system, said radar system being of the side-looking synthetic aperture type and having spacing gates supplying sample sequences, wherein said circuit comprises a generator for a phase signal equal to $\exp(i\pi(-2\alpha/N^2)m^2)$ in which $\alpha$ and N are two constants defined by the operating conditions of said radar system and m is the rank of the sample received, a first multiplier with first and second input ports, said first input port receiving the samples and said second input port being connected to said generator, and with an output port supplying a product signal $p_m$, an auto-correlator connected to said first multiplier and having an output port, and a second multiplier by $(2\alpha/N^2)$ connected to said output of said auto-correlator.

8. A circuit for processing a radar signal produced by a radar system, said radar system being of the side-looking synthetic aperture type and having spacing gates supplying sample sequences, wherein said circuit comprises an autoambiguimeter with an input port receiving the samples $s_m$ from said radar system and an output port, a generator having an output port delivering a phase signal equal to $(2\alpha/N^2)\exp(i\pi(2\alpha/N^2)n^2)$ in which $\alpha$ and N are two constants defined by the operating conditions of said radar system and n is a time lag assuming all whole values from 0 to N/2, and a multiplier with a first input port connected to said output port of said autoambiguimeter and a second input port connected to said output of said generator.

\* \* \* \* \*